UNITED STATES PATENT OFFICE.

ANTONIO J. CARBAJAL, OF MEXICO, MEXICO.

PROCESS OF ELABORATION AND PREPARATION OF PULQUE.

1,033,873. Specification of Letters Patent. Patented July 30, 1912.

No Drawing. Application filed August 23, 1911. Serial No. 645,520.

*To all whom it may concern:*

Be it known that I, ANTONIO J. CARBAJAL, citizen of the United Mexican States, residing at 1st Guerrero street No. 10, Mexico city, Federal District, Mexico, have invented a new and useful Process of Elaboration and Preparation of Pulque, of which the following is a specification.

This invention relates to a new process of elaboration and preparation of pulque and has for its object to provide a simple and thoroughly efficient method to prepare this beverage so that it may serve as a refreshment eliminating completely the noxious qualities of pulque.

Another object of this invention is to permit to get this beverage very far from the place of the production of hydromel (aguamiel) and obtaining the "pulque" in a fresh and very fine condition.

Pulque is the name of a Mexican beverage obtained by self-fermentation of the hydromel (aguamiel) or the unfermented juice of the Mexican *Agave* or "maguey" as it is called in Mexico. This plant belongs to the class of *Amaryllidæ* and is botanically termed *Agave Americana*.

The process, to which the plant is submitted, is entirely scientific, there being no foreign substance added to the juice to produce the beverage.

The unfermented juice hydromel (aguamiel) is filtered under pressure of 3–15 pounds, contact with air being avoided as much as possible. After being filtered, it is submitted to heat at a temperature of 60–70° C., in a vacuum apparatus in order to evaporate the watery substances. This process is continued until the juice is concentrated to the consistency of a syrup of about 25–40° Baumé. In this condition the hydromel (aguamiel) may be transported any distance, because it is sterilized and preserved against natural or self fermentation, notwithstanding its chemical composition. When it is desired to make "pulque" from this syrup, a part of this syrup is mixed with the necessary quantity of pure filtered water to obtain a solution of a strength between 6 and 10° of Baumé. The product so obtained is a natural, fresh and excellent hydromel (aguamiel) and when fermented the purest "pulque" is obtained. To this must there should be added the necessary quantity of pure yeast selected culture of "*Saccharomyces agavicæ*" (alcoholic ferment), and when desired a culture of "*Bacillus viscosus Carbajal*". (*Estudio Sobre El Pulque*, Dr. Antonio J. Carbajal, Mexico, 1901, page 31).

With this new procedure a pure and clean pulque is obtained.

After having so described my invention what I claim is the following:

1. In the preparation of pulque, the process which comprises subjecting *Agave* juice to filtration under pressure, and evaporating the filtrate to a syrup.

2. In the preparation of pulque, the process which comprises subjecting *Agave* juice to filtration under pressure, and evaporating the filtrate to a syrup of the consistency of from 25 to 40° Baumé.

3. In the preparation of pulque, the process which comprises subjecting *Agave* juice to filtration under pressure, heating the filtrate in a vacuum to obtain a syrup of about 25 to 40° Baumé, and mixing said syrup with water to obtain a beverage of a consistency of about 6–10° Baumé.

4. In the preparation of pulque, the process which comprises subjecting *Agave* juice to filtration, evaporating water from such filtrate, and adding a ferment to the product to obtain the beverage.

5. The process of preparing pulque which comprises filtering unfermented juice of the *Agave Americana*, heating the filtrate to evaporate the watery substances therefrom and to concentrate the filtrate to a syrup, and adding a ferment to produce the beverage.

6. The process of preparing pulque which comprises filtering the unfermented juice of *Agave Americana* under a pressure of from 3 to 15 pounds, heating the filtrate to a temperature of about 60–70° C. under reduced atmospheric pressure, concentrating the filtrate to a consistency of about 25–40° Baumé, and adding a ferment to produce the beverage.

In testimony whereof, I affix my signature in presence of two witnesses.

ANTONIO J. CARBAJAL.

Witnesses:
 P. HYLE,
 ARTHUR SOUER.

Copies of this patent may be obtained for five cents each, by addressing the "Commissioner of Patents, Washington, D. C."